United States Patent [19]
Wolf

[11] 3,924,927
[45] Dec. 9, 1975

[54] CORE GLASS FOR FIBER OPTICS
[75] Inventor: Warren W. Wolf, Reynoldsburg, Ohio
[73] Assignee: Owen-Corning Fiberglas Corporation, Toledo, Ohio
[22] Filed: Mar. 28, 1975
[21] Appl. No.: 563,022

[52] U.S. Cl............. 350/96 B; 106/50; 106/52; 428/373; 428/428
[51] Int. Cl.².. C03C 3/04; C03C 13/00; G02B 5/16
[58] Field of Search........ 106/50, 52; 428/373, 428; 350/96 B

[56] References Cited
UNITED STATES PATENTS
3,249,460  5/1966  Gerry................ 106/52 X
3,673,049  6/1972  Giffen et al.......... 428/428

FOREIGN PATENTS OR APPLICATIONS
38-3269  4/1963  Japan................ 106/39.6

OTHER PUBLICATIONS
Gates; L. E. et al. – "Refractory Glass Fibers" – Ceramic Bulletin 46 (2), 1967, pp. 202–205.

*Primary Examiner*—Helen M. McCarthy
*Attorney, Agent, or Firm*—Carl G. Staelin; John W. Overman; Patrick P. Pacella

[57] ABSTRACT
I have developed bulk zinc alkali silicate glass compositions for fiber optics. I use this glass as the core glass in a fiber optic composed of a cladding glass surrounding a core glass. My core glass is not sensitive to radiation.

9 Claims, No Drawings

CORE GLASS FOR FIBER OPTICS

This invention relates to fiber optics. More specifically, it relates to improved core glass compositions for fiber optics.

In the field of fiber optics, small diameter fibers transmit light from one point to another. These light transmitting fibers are composed of an outer cladding or sheath surrounding a central core. Industry bundles the fibers or filaments together to form light pipes. These light pipes are flexible and industry can curve them around obstacles and into remote or hard to reach places.

The index of refraction of the core is higher than the index of refraction of the cladding. Due to this difference between the index of refraction of the core and cladding, the light entering one end of a fiber is internally reflected along the length of the fiber. The principle of "total internal reflection" explains this result. This principle says that a light ray traveling from a material with a higher refractive index (core) to a material with a lower refractive index (cladding) will be reflected at the interface of the two materials.

The amount of light a light pipe transmits depends on the intensity of the light source, the cross sectional area of the cores of all the fibers, the losses at each end due to reflection, the absorption properties of the glass, and the length of the light pipe.

In making commercially acceptable glass light pipes, the chemical composition of the core and cladding is a key factor. In addition to having the proper indices of refraction, the core and cladding glasses should have similar viscosities and liquidus temperatures. These three properties control the ease with which industry can lay the cladding glass over the core glass.

One particular use of light pipes has been the automobile industries' use of them as dashboard indicators to indicate whether or not a headlight or taillight is working. If one of the lights fail, the light pipe transmits no light and the driver knows that lamp is not working.

Earlier, I developed boronfree glass compositions which are not as sensitive to radiation damage as the boroncontaining glass compositions of the prior art. I disclosed these boronfree glass compositions in U.S. Pat. application Ser. No. 477,881, filed on June 10, 1974.

I have now developed low cost, less radiation sensitive core glass compositions comprising bulk zinc alkali silicate glasses. These glasses show about a factor of 100 less radiation induced loss at 0.8 H than many lead borosilicate glass fibers.

The core glasses of this invention have the following composition:

| Ingredient | Weight Percent |
|---|---|
| $SiO_2$ | 61 to 64 |
| $Al_2O_3$ | 7 to 10 |
| ZnO | 15 to 24 |
| $Li_2O$ | 7 to 11 |
| $Sb_2O_3$ | 0 to 0.1 |

Preferred core glass compositions are:

| Ingredient | Weight Percent |
|---|---|
| $SiO_2$ | 62 63 |
| $Al_2O_3$ | 8 to 9 |
| ZnO | 18 to 21 |
| $Li_2O$ | 8 to 10 |
| $Sb_2O_3$ | 0 to 0.1 |

These core glass compositions have an index of refraction ranging from 1.545 to 1.560.

Conventional glass fiber forming processes draw fine glass fibers from small holes in the bottom of a reservoir of molten glass. Making optical glass fibers multiplies the usual problems of forming fibers the conventional way. These processes need two supplies of molten glass: one for the core glass and one for the cladding glass. Industry then pulls a composite fiber, 80 – 90% core and 10 – 20% cladding, from the glass supplies. To be able to do this at commercial speeds and form commercially acceptable products, we must carefully choose the composition of the core and cladding glasses.

The cladding glasses I employ with my core glasses can vary widely as long as the index of refraction of the core is higher than the index of refraction of the cladding. Naturally, I also have to consider the fiber forming properties of the glass compositions.

One preferred cladding glass composition is:

| Ingredient | Weight Percent |
|---|---|
| $SiO_2$ | 50 to 60 |
| $Al_2O_3$ | 5 to 10 |
| BaO | 0 to 20 |
| $Na_2O$ | 20 to 40 |
| $Sb_2O_3$ | 0 to 0.05 |

These cladding glass compositions have an index of refraction ranging from 1.50 to 1.55.

The following examples further illustrate my invention.

EXAMPLE I

| Ingredient | | Weight Percent |
|---|---|---|
| $SiO_2$ | | 62.6 |
| $Al_2O_3$ | | 8.2 |
| ZnO | | 19.6 |
| $Li_2O$ | | 9.6 |
| $Sb_2O_3$ | | 0.05 |
| Liquidus Temperature, °F | | 2048 |
| Viscosity Temperature, °F | | |
| At Log Poise | 2.00 | 2365 |
| | 2.25 | 2238 |
| | 2.50 | 2125 |
| | 2.75 | 2028 |
| Refractive Index | | 1.554 |

These core glass compositions are not sensitive to radiation damage. These glasses show about a factor of 100 or less radiation induced loss at 0.8 H than many lead borosilicate glass fibers.

I can use this core glass composition with the following 2 cladding glass compositions to make light transmitting optical fiber products.

| Ingredient | Weight Percent Example 2 | Example 3 |
|---|---|---|
| $SiO_2$ | 53.5 | 57.4 |
| $Al_2O_3$ | 7.6 | 8.1 |
| BaO | 11.4 | — |

-continued

| Ingredient | Weight Percent Example 2 | Weight Percent Example 3 |
| --- | --- | --- |
| Na₂O | 27.6 | 34.5 |
| Sb₂O₃ | 0.05 | 0.05 |
| Liquidus Temperature, °F | 1437 | 1535 |
| Viscosity Temperature, °F | | |
| At Log Poise 2.00 | 2343 | 2380 |
| 2.25 | 2212 | 2245 |
| 2.50 | 2097 | 2130 |
| 2.75 | 2000 | 2025 |
| 3.00 | 1915 | 1933 |
| Refractive Index | 1.53 | 1.51 |

I disclosed these cladding glass compositions in U.S. Pat. application Ser. No. 477,881; and they also are not sensitive to radiation.

I have described this invention in considerable detail and do not wish to be limited to the particular embodiments shown. I intend to include modifications and variations within the scope of the appended claims.

I claim:

1. A bulk zinc alkali silicate glass composition having an index of refraction ranging from 1.545 to 1.560, suitable for use as fiber optics and consisting essentially by weight of:

|  | Weight Percent |
| --- | --- |
| SiO₂ | 61 to 64 |
| Al₂O₃ | 7 to 10 |
| ZnO | 15 to 24 |
| Li₂O | 7 to 11 |
| Sb₂O₃ | 0 to 0.1. |

2. A glass composition according to claim 1 consisting essentially by weight of:

|  | Weight Percent |
| --- | --- |
| SiO₂ | 62 to 63 |
| Al₂O₃ | 8 to 9 |
| ZnO | 18 to 21 |
| Li₂O | 8 to 10 |
| Sb₂O₃ | 0 to 0.1. |

3. A glass composition according to claim 1 consisting essentially by weight of:

|  | Weight Percent |
| --- | --- |
| SiO₂ | 62.6 |
| Al₂O₃ | 8.2 |
| ZnO | 19.6 |
| Li₂O | 9.6 |
| Sb₂O₃ | 0.05 | and having an index of refraction of 1.554.

4. A light transmitting glass fiber comprising a cladding glass surrounding a core glass, the core glass having an index of refraction greater than that of the cladding glass, the core glass having the composition of claim 1, and wherein the cladding glass consists essentially by weight of:

|  | Weight Percent |
| --- | --- |
| SiO₂ | 50 to 60 |
| Al₂O₃ | 5 to 10 |
| BaO | 0 to 20 |
| Na₂O | 20 to 40 |
| Sb₂O₃ | 0 to 0.05 | and has an index of refraction ranging from 1.500 to 1.550.

5. A light transmitting fiber according to claim 4 in which the the core glass consists essentially of:

|  | Weight Percent |
| --- | --- |
| SiO₂ | 62 to 63 |
| Al₂O₃ | 8 to 9 |
| ZnO | 18 to 21 |
| Li₂O | 8 to 10 |
| Sb₂O₃ | 0 to 0.1. |

6. A light transmitting fiber according to claim 4 in which the core glass consists essentially of:

|  | Weight Percent |
| --- | --- |
| SiO₂ | 62.6 |
| Al₂O₃ | 8.2 |
| ZnO | 19.6 |
| Li₂O | 9.6 |
| Sb₂O₃ | 0.05 | and having an index of refraction of 1.554.

7. A light transmitting glass fiber according to claim 6 wherein the cladding glass is one selected from the group consisting of

|  | Weight Percent | |
| --- | --- | --- |
| SiO₂ | 53.5 | 57.4 |
| Al₂O₃ | 7.6 | 8.1 |
| BaO | 11.4 | — |
| Na₂O | 27.6 | 34.5 |
| Sb₂O₃ | 0.05 | 0.05 |
| Refractive Index | 1.53 | 1.51. |

8. A light transmitting optical fiber bundle comprising a plurality of the light transmitting glass fibers of claim 4.

9. A light transmitting optical fiber bundle comprising a plurality of the light transmitting glass fibers of claim 7.

* * * * *